United States Patent [19]

Kalt et al.

[11] 4,274,256
[45] Jun. 23, 1981

[54] TURBINE POWER PLANT WITH BACK PRESSURE TURBINE

[75] Inventors: Jörg Kalt, Nussbaumen; Rolf Kehlhofer, Dielsdorf, both of Switzerland

[73] Assignee: BBC Brown Boveri & Company Limited, Baden, Switzerland

[21] Appl. No.: 40,722

[22] Filed: May 21, 1979
(Under 37 CFR 1.47)

[30] Foreign Application Priority Data

May 19, 1978 [CH] Switzerland .......................... 5458/78

[51] Int. Cl.³ .......................... F02C 6/18; F02G 5/02
[52] U.S. Cl. .................................. 60/39.18 B; 60/659
[58] Field of Search .................... 60/39.18 B, 659, 648

[56] References Cited

U.S. PATENT DOCUMENTS

| 1,896,308 | 2/1933 | Hellborg | 60/659 |
| 3,879,616 | 4/1975 | Baker et al. | 60/39.18 B |
| 3,890,789 | 6/1975 | Beckmann et al. | 60/659 |

FOREIGN PATENT DOCUMENTS 1215459 11/1959 France ................. 60/39.18 B

Primary Examiner—James J. Gill
Attorney, Agent, or Firm—Burns, Doane, Swecker & Mathis

[57] ABSTRACT

A combined gas/steam turbine power plant is disclosed including a gas turbine having a combustion chamber and a steam turbine driven by steam generated with heat from the combustion gases of the gas turbine. The steam is utilized in a technological process downstream of the steam turbine. Relatively small fluctuations in back pressure are compensated by varying a delivery of fuel to the combustion chamber. Relatively large fluctuations in back pressure are compensated by supplying live steam directly to the technological process downstream of the steam turbine. Various devices are provided for conditioning the steam prior to being supplied to the technological process.

9 Claims, 2 Drawing Figures

TURBINE POWER PLANT WITH BACK PRESSURE TURBINE

BACKGROUND AND SUMMARY OF THE PRESENT INVENTION

The present invention relates generally to a combined gas/steam turbine power plant having a back pressure turbine.

In power plants, a steam turbine is normally driven by steam at a generally constant pressure. The live steam pressure is typically kept constant by controlling firing of a steam boiler. In the event that the steam turbine operates with back pressure, it follows that the back pressure is regulated by inlet valves of the steam turbine. Such a mode of operation can also be applied in the case of combined gas/steam turbine plants. If the plant is, however, relatively often driven at partial load, it follows that regulating the back pressure in this manner is thermodynamically unfavorable since the stack temperature then rises rather sharply.

The additional exhaust gas quantity could be utilized by a downstream-installed low-pressure evaporator during which process steam is generated and the thermodynamic efficiency of the plant could thereby be improved. On the whole, the total efficiency is, however, poorer in spite of this arrangement since the generated low-pressure steam is of little value.

A primary object of the present invention is to avoid the abovementioned deficiencies and to achieve an improvement of the thermodynamic efficiency of combined gas/steam turbine plants of the abovementioned type.

BRIEF DESCRIPTION OF THE DRAWINGS

Preferred embodiments of apparatus according to the present invention are described with reference to the accompanying drawings wherein like members bear like reference numerals and wherein.

DETAILED DESCRIPTION OF THE PREFERRED EMBODIMENTS

Figure 1:
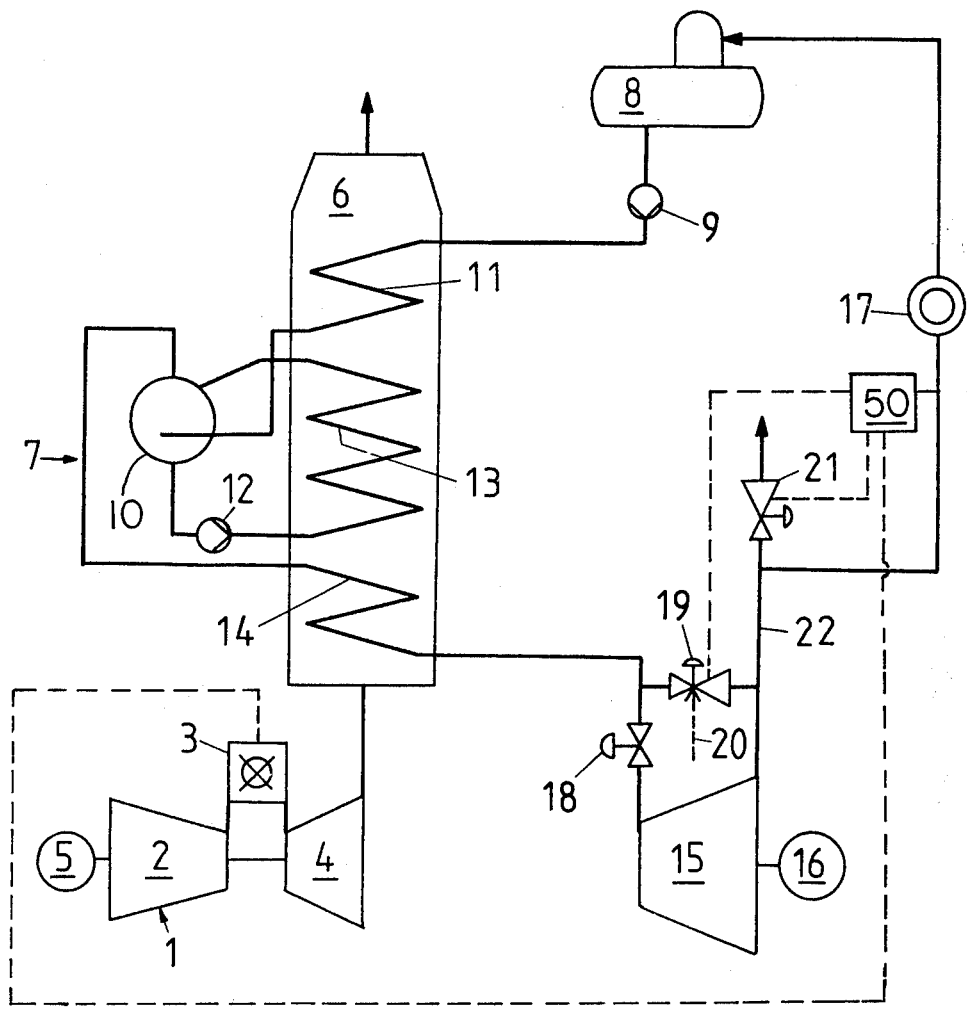
FIG. 1 is a schematic illustration of a preferred embodiment of apparatus according to the present invention; and, FIG. 2 is a schematic illustration of another preferred embodiment of apparatus according to the present invention.

A first preferred embodiment of apparatus according to the present invention, with reference to FIG. 1, includes a gas/steam turbine power plant especially for industrial purposes. The plant includes a gas turbine arrangement including a compressor 2 and turbine component 4 with a combustion chamber 3 arranged between the turbine and compressor. The gas turbine drives a generator 5 for the production of electrical current.

Exhaust gases from the gas turbine flow into a waste heat stack 6 in which are arranged heating surfaces of a steam boiler 7. The steam boiler 7 is fed with boiler water through a feedwater pump 9 from a feedwater mixing heater 8. The steam boiler includes a steam drum 10, an economizer 11, a circulating pump 12, an evaporator 13 and a superheater 14.

From the superheater 14, the steam passes into a back pressure steam turbine 15 having a generator 16. Thereafter, the steam is used for performing a technological process in a point of steam utilization 17. The condensate accumulating therewith then passes again into the feedwater mixing heater 8 from where the steam is returned into the boiler 7 through the feedwater pump 9.

In order to be able to optimally carry out the technological process at the point of steam utilization 17, a specified steam condition must typically be maintained. With plants well known today, the control of the back pressure of the steam downstream from the turbine is attained in that the inlet valves upstream from the turbine are adjusted whereupon the fuel delivery to the gas turbine is increased or decreased depending on the desired effect on the back pressure and in order to adjust the exhaust heat to the process consumption. This type of control, however, is accompanied by the initially mentioned disadvantages.

In the present combination gas/steam turbine power plant, the control of the process steam pressure always takes place with a fully opened inlet valve 18. Slight fluctuations are thereby compensated for exclusively by controlling the gas turbine (as by a suitable, conventional controller 50). In order to be able to rapidly compensate for rather large pressure drops, a bypass valve 19 is provided upstream from the fully opened inlet valve 18 of the steam turbine. A drain valve 21 is also provided downstream from the steam turbine between both the bypass valve 19 (having an injection cooler 20) and the point of steam utilization to rapidly compensate for rather large pressure increase.

If the pressure drop exceeds a certain predetermined degree, it follows that the bypass valve is opened and a part of the live steam is branched off upstream from the turbine directly into the back pressure steam line 22. On the other hand, if the back pressure upstream from the point of steam utilization 17 becomes too high, it follows that the drain valve is opened. As a result, the pressure drops quite rapidly to the most favorable level for the process. In this way, it is possible to achieve a very rapidly reacting control of the process steam pressure.

Figure 2:
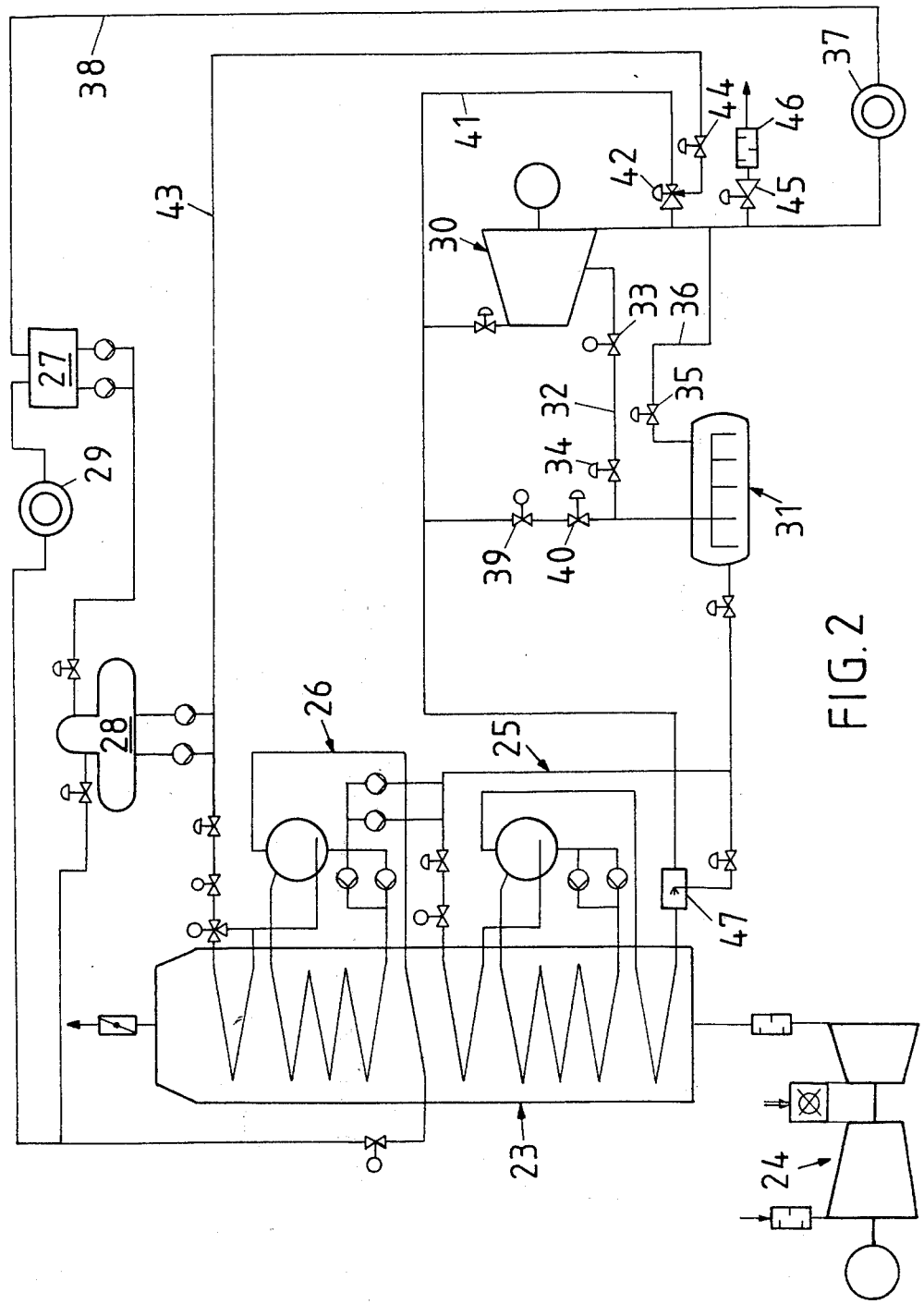

With reference now to FIG. 2, a more efficient embodiment of a combination power plant according to the present invention includes a waste heat stack 23 of a gas turbine generator 24 containing the heating surfaces of a high-pressure boiler 25 and a low-pressure boiler 26. The feeding of this boiler takes place from a condensate container 27 through a feedwater mixing (type) heater 28. The steam produced in the low-pressure boiler 26 is used for performing a technological process in a point of steam utilization 29. The condensate formed in the latter is returned into the condensate container 27.

In addition, with the plant of FIG. 2, a compensation of minimal back pressure fluctuations occurs downstream from the steam turbine generator 30 directly by a change of fuel delivery for the gas turbine (as by the suitable, conventional controller 50). There are, however, two possibilities for compensating for rather large pressure fluctuations.

The first and predominantly used possibility includes a conventional Ruth's steam accumulator 31 to which extraction steam is supplied from an intermediate stage of the steam turbine through an extraction steam line 32, an isolating valve 33 and a control valve 34 when the back pressure is to drop. If the back pressure is to rise, it follows that steam is removed from the steam accumulator 31 through a valve 35 and a steam line 36 and delivered to the process circuit downstream from the turbine. The condensate produced in the point of steam utilization 37 is returned into the condensate container 27 through a condensate offtake 38. If the pressure fluctuations are quite large or if the steam turbine is not in operation, it follows that the live steam is passed directly into the point of steam utilization 37 through a bypass line 41 and a control valve with an injection cooler. Furthermore, for the purpose of cooling down the live steam to the temperature required for the process, condensate is injected into control valve 42 through a feedwater injection line 43 and an injection valve 44. As with the embodiment according to FIG. 1, a drain valve 45 is provided for draining excess steam into the open through a sound attenuator 46 when the back pressure becomes too high.

The last described control circuit consisting of elements 41 to 46 is generally only used in cases when a disturbance appears in the control circuit with the Ruth's steam accumulator. In addition, the control circuit is used for regulation when an extremely high steam requirement appears and the gas turbine is already operating with maximum load. This additional steam requirement is covered by both bypassing the steam turbine and injecting condensate into the control valve 42 whereby additional process steam is generated with the desired temperature.

With the plant according to FIG. 2, an injection cooler 47 that is fed from the steam accumulator 31 is installed at the superheater outlet and is used for regulating the live steam temperature upstream from the steam turbine.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A combined gas/steam turbine power plant, comprising:
   a gas turbine having a combustion chamber;
   steam generation means for utilizing exhaust from the gas turbine to generate steam;
   a steam turbine, said steam turbine being selectively supplied with said steam from the steam generation means;
   first means for utilizing the steam downstream of the steam turbine;
   second means for compensating for relatively small fluctuations in back pressure of the steam upstream of the first means and downstream of the steam turbine, said second means selectively varying a delivery of fuel to the combustion chamber of the gas turbine;
   third means for compensating for relatively large fluctuations in the back pressure of the steam upstream of the first means and downstream of the steam turbine, said third means selectively supplying live steam directly to the first means and selectively venting said live steam.

2. The power plant of claim 1, wherein the third means includes:
   fourth means for controlling the live steam, supplied by the third means to the first means, to a state required for utilization by the first means.

3. The power plant of claim 1 wherein the first means utilizes the steam in the performance of a technological process.

4. The power plant of claim 1 wherein the third means includes:
   a bypass line;
   a bypass valve; and
   a drainage valve.

5. The power plant of claim 2 wherein the fourth means includes an injection cooler.

6. The power plant of claim 1 wherein the third means includes:
   a steam accumulator;
   at least one bypass line;
   at least one control valve; and
   an extraction steam line leading into the steam accumulator from a stage of the steam turbine.

7. The power plant of claim 6 wherein the third means further includes:
   a feedwater injection line; and
   an injection control valve.

8. A method of controlling back pressure in a combinted gas/steam turbine power plant, comprising the steps of:
   combusting a fuel in a combustion chamber;
   driving a gas turbine with the combusted fuel;
   generating steam with the combusted fuel;
   driving a steam turbine with the steam;
   utilizing the steam downstream of the steam turbine in a first technological process;
   compensating for relatively small fluctuations in back pressure of the steam upstream of the first technological process and downstream of the steam turbine by selectively varying a supply of fuel to the combustion chamber;
   compensating for relatively large fluctuations in back pressure of the steam upstream of the first technological process and downstream of the steam turbine by selectively supplying live steam directly to the first technological process and selectively venting said live steam.

9. The method of claim 8 further comprising the step of:
   conditioning the live steam supplied directly to the first technological process to a state required for utilization.

* * * * *